Patented Nov. 23, 1948

2,454,336

UNITED STATES PATENT OFFICE 2,454,336

PROCESS FOR THE TREATMENT OF GOLD- AND SILVER-BEARING ORES, RESIDUES, AND OTHER PRODUCTS

Arthur Frederick Bernard Norwood, Dalkeith, Victoria, Australia

No Drawing. Application November 19, 1946, Serial No. 710,942. In Australia January 21, 1946

3 Claims. (Cl. 75—113)

This invention relates to an improved process for the treatment of gold- and silver-bearing ores, residues and other products.

In many cases such material is not amenable to treatment with cyanide solutions, as much or the whole of the gold is in such a form or is so associated with the gangue material as to be insoluble.

A process has been described in which material of the foregoing character is roasted together with a large amount of salt, a source of sulphur and carbonaceous material such as sawdust. The effect of this roasting operation so carried out is to convert a substantial proportion of the gold and silver present in the material into a form which is amenable to cyanide treatment.

A curious fact has been found by me, namely that the percentage of metals transformed, or in other words the possible percentage of recovery by the subsequent cyanide process, is for a certain temperature practically a fixed proportion, irrespective of the grade of material being treated. In other words, the same possible percentage recovery can only be obtained from ore containing two ounces per ton as from ore containing only three or four dwts. per ton. This has led me to the view that the conversion of the gold present in the ore from the non-amenable form to that which can be treated with cyanide is due to the intermediate formation of chloride of gold which is reduced by the carbon, and that the proportion of this chloride of gold in the specific particles that can be formed is subject to a balanced reaction. That is to say, no more than a certain proportion of chloride of gold can be formed irrespective of the concentration of free chlorine, because when that stage is reached, the gold chloride dissociates back into its constituents. Following on this explanation of observed facts, I have applied it to the treatment of material of the type referred to.

It will be realised that normally the immediate retreatment of any material by a process is practically a waste of time. This is because any recovery made is practically only a measure of the lack of efficiency with which the process was carried out. In the application of the process above described, I have found that re-roasting the material a second time adding carbonaceous material, a source of sulphur, and making up any deficiency in the salt, does not effect any material increase in the amount of gold which can be obtained by cyanide treatment as compared to the amount that can be obtained from the material after it has been roasted once only. However, I have also found that after roasting the material and then extracting the available gold with cyanide, a residue is obtained in which another roasting and re-treatment with cyanide will abstract about the same percentage of gold present in the residue as was originally extracted after the first roasting. This obviously provides a means for the obtainment of a very high overall recovery when treating rich material. It also gives important economies in this respect that when treating the rich material in the first roasting, the temperature can be kept relatively low, that is to say, about 700° C., so as to reduce the volatilisation loss on the large amount of gold present, whereas in the second roasting the temperature can be pushed to 800° C. or perhaps even higher so as to bring the residues down to the lowest possible point.

In many cases a still higher recovery can be made when the material to be treated initially contains some cyanide soluble gold. In such case, it is pulped with a strong or saturated brine protectively alkaline and containing cyanide in solution and agitated for a sufficient length of time. The effect is that after separating the excess brine from the material, salt will have been added to the material and gold removed therefrom. The material is then formed into a charge containing a source of sulphur (suitably about 3% of pyrite), carbonaceous material (suitably about 4% of sawdust), if necessary with the addition of further solid salt to give the high salt content required (preferably from ten to thirteen per cent).

This charge is roasted, and if high grade, the temperature is preferably not allowed to exceed 700° C. After roasting the calcines are treated with a strong brine protectively alkaline and containing cyanide. This will remove some of the salt and soluble gold. The residues are then re-treated by the addition of solid salt if necessary to make up the loss, carbonaceous material and a source of sulphur, and roasted. The roaster calcine is agitated with brine protectively alkaline and containing cyanide in solution. This removes salt and some of the gold. The calcines are then given a final leach with cyanide solution and washed.

As an illustrative example, refractory arsenical material contained 70 dwts. of gold to the ton, of which 30 dwts. was initially soluble in cyanide. This left a residue which on being given a chloridising roast and cyanided with a strong brine gave a residue containing 12 dwts.

to the ton. On making this into a charge, re-roasting and cyaniding with a weak brine, a residue containing 3 dwts. per ton remained. After final cyanidation and washing, the residue contained only 1.5 dwts. per ton. This represented a total recovery of 98% of the gold contents.

The meaning of the words "a large amount of a soluble chloride such as sodium chloride" is a proportion of chloride far in excess of what would be indicated for actual chloridising the gold present and far in excess of amounts that have been hitherto used. Thus, in previous processes of chloridising roasting, it has been customary to use two to three per cent of salt. Although lesser amounts would have some utility, yet for optimum conditions ten to thirteen per cent will give the best results, at any rate with a roasting temperature of about 800° C., which is about as high as it is desirable to go. Therefore the process includes the use of less than 10% of salt, although the use of such lesser amount is at the cost of higher volatilisation losses.

It has been found that after the roasting re-action has been completed and the reducing material consumed, there is a loss of gold so long as the charge is above a temperature of 500° C. It is therefore important that the charge be cooled quickly after the roasting re-action has been completed.

In the specification reference to roasting a charge so as to convert an economic proportion of the gold present into a form amenable to subsequent cyanide treatment simply means roasting the charge made up as specified to a sufficient but not an excessive temperature whereby sufficient gold is converted to a soluble form so as to make its subsequent treatment worth while.

In this specification when reference is made to gold, it is to be deemed to include silver if this metal is present.

I claim:

1. A process for the treatment of gold- and silver-bearing ores, residues and other products consisting of forming the finely divided material into a charge containing carbonaceous material, a source of sulphur, and a large amount of a soluble chloride such as common salt; roasting this charge at a temperature about, but not above 700° C. so as to convert an economic proportion of the gold present into a form amenable to subsequent cyanide treatment; extracting the gold with cyanide; and then forming the treated residues into a charge containing carbonaceous material, a source of sulphur and a large proportion of soluble chloride such as common salt; roasting this charge, preferably at a higher temperature about 100 C. higher than previously; and extracting soluble gold from the roaster calcines obtained.

2. An improved process for the treatment of gold- and silver-bearing ores, residues and other products comprising pulping the finely divided material with a strong or saturated brine; separating the excess brine; forming the material into a charge containing carbonaceous material, a source of sulphur and a large amount of a soluble chloride such as common salt, if necessary by the further addition of salt; roasting the charge at a temperature about, but not above 700° C. so as to convert an economic proportion of the gold present into a form amenable to subsequent cyanide treatment; leaching the roaster calcines with brine containing cyanide to extract soluble gold; forming the material into a charge containing carbonaceous material, a source of sulphur, and a large amount of a soluble chloride such as common salt, if necessary by the addition of further salt; roasting the charge at about 800° C.; treating the roaster calcines with water or a weak brine to extract salt to be subsequently re-used in making up a charge; and finally leaching the residues with a cyanide solution to extract the remaining soluble gold.

3. An improved process for the treatment of gold- and silver-bearing ores, residues and other products comprising pulping the material with a strong or saturated brine protectively alkaline and containing cyanide in solution; removing the excess brine after the soluble gold has been dissolved, thereby removing soluble gold but leaving salt in the material; forming this material into a charge containing carbonaceous material, a source of sulphur and a high proportion of soluble chloride such as common salt, if necessary by the addition of further salt; roasting the material at a temperature of about, but not above 700° C.; treating the roaster calcines with a strong brine protectively alkaline and containing cyanide in solution, thereby extracting the soluble gold; forming the residue into a charge containing carbonaceous material, a source of sulphur and a large amount of a soluble chloride such as common salt, if necessary by the addition of further salt; roasting the charge at about 800° C.; treating the roaster calcine with water or a weak brine protectively alkaline and containing cyanide solution, thereby removing salt for re-use and some of the soluble gold; then treating the residue with a cyanide solution so as to remove the remaining soluble gold.

ARTHUR FREDERICK BERNARD NORWOOD.

REFERENCES CITED

The following references are of record in the file of this patent:

UNITED STATES PATENTS

| Number | Name | Date |
| --- | --- | --- |
| 1,556,822 | Hofstrand | Oct. 13, 1925 |